Nov. 1, 1927.
J. E. KEEFE
1,647,637
DENTAL HANDPIECE STERILIZER
Filed June 30, 1926
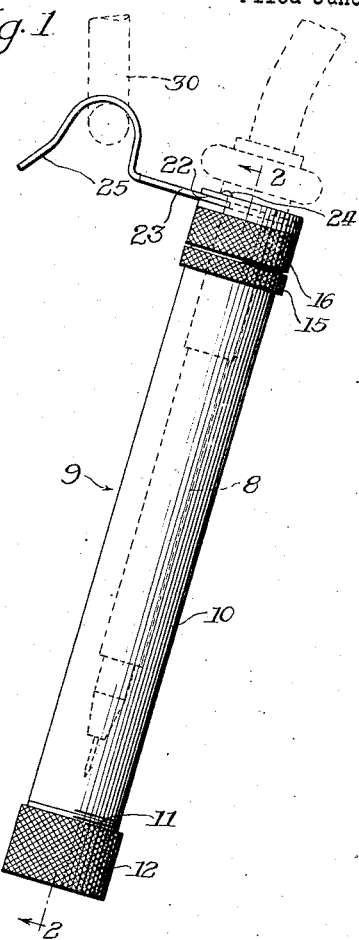
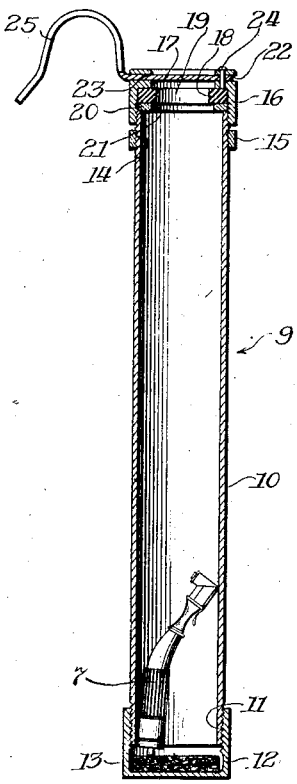
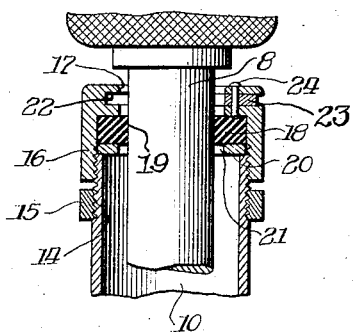
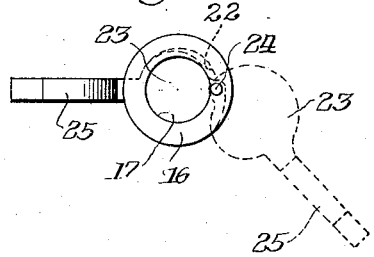
Inventor:
James E. Keefe.
By Williams, Bradbury, McCaleb & Hinkle Attys.

Patented Nov. 1, 1927.

1,647,637

UNITED STATES PATENT OFFICE.

JAMES E. KEEFE, OF CHICAGO, ILLINOIS.

DENTAL HAND-PIECE STERILIZER.

Application filed June 30, 1926. Serial No. 119,519.

This invention relates to sterilizers, and more particularly to a sterilizer for dental hand pieces.

The main object of this invention is to provide an improved means for sterilizing the hand piece of a dental engine.

Another object of my invention is to provide a sterilizer for dental hand pieces which is of simple construction and convenient and handy to use.

A further object of my invention is to provide a dental hand piece sterilizer having means for preventing the escape of gaseous fumes from the disinfectant, which means is adjustable to accommodate different size hand pieces.

A still further object of my invention is to provide a dental hand piece sterilizer having an improved closure to prevent the escape of fumes from the disinfectant when the sterilizer is not in use.

In performing dental work such as cutting or grinding teeth in the patient's mouth, a hand piece is used to hold the burr or drill being used, and to provide a convenient means for guiding the drill or burr. This hand piece is suitably fastened to a flexible casing extending from the dental engine or motor, and a flexible shaft enclosed in the casing transmits power from the engine to the hand piece to rotate the burr or drill held in the hand piece. When this hand piece is used, a substantial portion of it enters the patient's mouth. Fluids of the mouth are smeared over the hand piece by the fingers of the dentist and some of the fluids are carried by the instrument held by the hand piece to the inner parts of the hand piece, and, therefore, requires sterilization before the next patient takes the chair. Due to the connection of the hand piece with the dental engine through the flexible shaft, it has been at all times awkward to sterilize this hand piece. It must either be disconnected from the flexible shaft, which consumes considerable time and effort, or it may be sterilized by bathing it with some disinfectant while it remains connected to the shaft. Both methods, however, have proven unsatisfactory, due to the awkwardness of the task, and because of the inconvenience of sterilizing the dental hand piece it is oftentimes neglected and does not receive the proper amount of sterilization. In my invention I have provided a device which is so convenient to use that the tendency of neglect is overcome and an effectual means of sterilization is provided.

My invention consists in a container for disinfectant material, adapted to contain the dental hand piece whenever it is not in use, and a convenient means which cooperates with the sterilizer to support it and the contained dental hand piece.

Further features and advantages of my invention will readily become apparent through the following detailed description and accompanying drawings, in which:

Figure 1 is a view of the sterilizer of my invention, showing in dotted lines a dental hand piece contained therein;

Figure 2 is a longitudinal cross-sectional view of the sterilizer taken on the line 2—2 of Figure 1;

Figure 3 is an enlarged detailed sectional view of the sterilizer illustrating the adjustable seal; and Figure 4 is a plan view of the sterilizer, with the closure shown in an open position in dotted lines.

Referring now to the drawings in detail, in which like reference characters designate like parts throughout the several views, the numeral 9 designates in general the hand piece sterilizer, having a cylindrical metal tube 10 which forms the main body of the container, and which is threaded at 11 at its lower end to receive a knurled cap 12. A pad 13 (Fig. 2) of cotton batting or other suitable substance is adapted to rest in the knurled cap 12 at the bottom of the container to contain and absorb the disinfectant used. The upper part of the tube 10 is threaded at 14 and has a knurled ring 15 screwed thereon to provide a convenient means of gripping the upper portion of the tube 10 and also serve as a locknut for a knurled cap 16 which is threaded and adapted to be screwed on the upper end of the tube 10 on the threads 14. A circular opening 17 is provided in the cap 16 through which a dental hand piece 8 may be inserted. A soft rubber washer 18, having an aperture 19 therein is interposed between the inner surface of the cap 16 and a metal washer 20, which rests upon the top of the light metal tube 10. This metal washer 20 has a circular opening 21 therein similar in size and in alignment with the circular opening 17 of the cap 16. A horizontally disposed slot 22 is cut in the cap 16 and is adapted to receive a thin, disc like closure 23 which is pivoted and secured to the cap 16 by means of a rivet 24. Extending from this closure 23 and formed integral therewith is a downwardly bent hook 25 which serves the double purpose of a supporting hook and a grip for operating the closure 23 (Fig. 1).

The device is very easy and simple to use. To load it with disinfectant, the cap 12 at the lower end of the tube is unscrewed and the pad 13 is removed and saturated with formaldehyde or some other suitable disinfectant. Contra-angle hand pieces 7 may be placed in the tube for sterilization when the cap 12 is unscrewed (Fig. 2).

The disinfectant pad 13 is then replaced in the cap 12, which is again screwed in place at the bottom of the tube 10. The cap 16 at the upper end of the tube is loosened so that the soft rubber washer 18 rests in a normal position between the metal washer 20 and the inner surface of the cap 16. The dental hand piece 8 is then inserted in the sterilizer 9 through the apertures 17 of the cap 19 of the soft rubber washer and 21 of the metal washer 20, as illustrated in Figure 3. After the dental hand piece 8 is inserted into the tube 10 as described, the cap 16 may be screwed down slightly on the tube which will cause the soft rubber washer 18 to be compressed between the under side of the cap 16 and the metal washer 20. As the soft rubber washer 18 is compressed, the hole 19 will become smaller and, therefore, be tightened around the dental hand piece 8. It is quite obvious that by maintaining a snug fit in this manner between the soft rubber washer 18 and the dental hand piece 8, the fumes from the disinfectant will be prevented from escaping the container. This feature also allows for adjustment should any wear occur on the surface of the dental hand piece itself or in the rubber washer 18. It is apparent that this adjustable feature allows the sterilizer to be used in connection with dental hand pieces having body portions of various diameters by merely adjusting the cap 16. After the withdrawal of the hand piece from the sterilizer, the disc closure 23 is rotated upon the pin or rivet 24 to a position where it enters the slot 22 of the cap 16 and completely closes the circular opening 17 in the cap 16 of the sterilizing device 9 as best shown in Figs. 2 and 4. This closure 23 prevents the escape of any gaseous fumes from the disinfectant while the dentist is using the hand piece and the sterilizing device is not being used, and also prevents the accumulation of any dust or foreign matter in the sterilizer.

The hook member 25 formed integral with the closure member 23 serves as a support for the sterilizer and is adapted to engage a supporting member 30 shown in Figure 1, such as is found on the framework of any dental engine.

It is to be understood that my invention is not limited to the specific design illustrated in the drawings, but only by the scope of the appended claims.

I claim—

1. A container for sterilizing dental hand pieces, comprising a tube having a cap screwed on the lower end thereof completely closing said end, an absorbent pad placed therein to contain disinfectant, a metallic ring resting on the top of said tube, an apertured cap having a horizontal slot therein screwed over the top of said tube, a rubber washer having a circular opening therein disposed and adapted to be compressed between the inner surface of said cap and said ring to reduce the size of the opening in the rubber washer, a disc closure member pivotally mounted in the horizontal slot of said cap, and a hook formed on said closure for manipulating the closure to close the aperture in the cap and also serve as a support for the tube.

2. A container for sterilizing dental hand pieces, comprising a tube, the lower end of which is closed completely, an absorbent pad placed therein to contain disinfectant, a metal washer resting on the upper end of said tube, an apertured cap screwed over the top of said tube, an elastic member having an opening therein to admit a hand piece to be sterilized disposed between said washer and said cap and adapted to be compressed between said cap and said washer when the cap is screwed down on the tube to reduce the size of the opening in the elastic member and tighten it about the hand piece to be sterilized, and a closure member pivotally mounted in said cap adapted to be pivoted and close the aperture in the cap.

3. In a container for sterilizing dental hand pieces, the combination of a tube, one end of which is completely closed, and means for partially closing the opening in the other end of said tube, comprising a metal ring resting on top of said tube, a cap screwed over the top of said tube and an elastic washer disposed and adapted to be compressed between said cap and ring to vary the size of the opening in the end of said tube.

In witness whereof, I hereunto subscribe my name this 26 day of June, 1926.

JAMES E. KEEFE.